3,167,551
METHYLATION OF NITROGEN HETEROCYCLES
Eugene A. Weipert, Taylor, Mich., assignor to Wyandotte Chemicals Corporation, Wyandotte, Mich., a corporation of Michigan
No Drawing. Filed June 21, 1961, Ser. No. 118,500
11 Claims. (Cl. 260—247)

This invention relates to a process for the production of N-methylated heterocycles and, more particularly, it relates to the production of N-methylated piperazines and morpholines.

The use of formaldehyde to methylate amines and ammonia is not new in the art. Eschweiler (Ber., 28c, 581 (1895); Ber., 38, 880 (1905)) first described the methylation of ammonia and amines with formaldehyde. However, Eschweiler's process has certain disadvantages. In his process the methylation reaction must be carried out in a pressure vessel at a temperature of 130–160° C. and a pressure of 1,000 p.s.i.g. The difficulties and potential hazards of these conditions are apparent since one of the products of the reaction is carbon dioxide gas. The application of Eschweiler's process to the preparation of N-methylated heterocycles has resulted in low conversions and a product containing a considerable amount of entrapped carbon dioxide gas, which makes it difficult to separate and recover the desired product. Therefore, it is readily apparent that the Eschweiler process has several disadvantages.

Subsequently, Clarke et al. (J. Am. Chem. Soc., 55, 4571 (1933)) modified the Eschweiler process by carrying out the reaction at atmospheric pressure in the presence of formic acid and formaldehyde. However, the use of formic acid is undesirable in that it is highly corrosive and considerably more expensive than formaldehyde.

It is apparent from the foregoing that each of the processes described has certain disadvantages which render it undesirable for the production of N-methylated heterocycles.

Therefore, it is an object of this invention to provide a new and improved process for producing N-methylated heterocycles.

Another object of this invention is to provide a process for the methylation of saturated nitrogen heterocycles with formaldehyde at atmospheric pressure.

Thus, it was surprisingly and unexpectedly discovered that N-methylated heterocycles are prepared in high yields and the stated objects and other objects are accomplished by contacting a saturated nitrogen heterocycle corresponding to the formula:

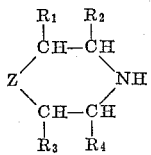

wherein $R_1$, $R_2$, $R_3$ and $R_4$ may be hydrogen, methyl, or ethyl radicals which may be the same or different and wherein Z is O or NH with formaldehyde in the proportion of about 2 to 4 mols of formaldehyde per nitrogen atom in said heterocycle. The reaction takes place at a temperature of about 85 to 100° C. and at about atmospheric pressure.

When 2-methylpiperazine was methylated according to the Eschweiler process in a pressure vessel at a temperature of 150° C. and at a pressure of 1,000 p.s.i.g. the resulting conversion of 2-methylpiperazine to 1,2,4-trimethylpiperazine was 54%. In addition to the low conversion, the resulting product was a foam due to the evolution of carbon dioxide gas during the reaction.

Therefore, it was surprising indeed when it was discovered that the methylation of piperazines at a temperature of about 85 to 100° C. and at atmospheric pressure resulted in conversions of greater than 80% and a product essentially free of carbon dioxide gas. It is apparent that the process of this invention differs considerably from Eschweiler's process in reaction temperature and pressure and results in conversions vastly superior to those of the Eschweiler process.

The N-methylated heterocyclic compounds prepared by the process of this invention are N-methylated piperazines and morpholines and include both N,N'-dimethylpiperazine and N-methyl-morpholine and N,N'-dimethylpiperazines and N-methylmorpholines having alkyl-substituted carbon atoms. Thus, the compounds are tertiary amines which are useful as urethane foam catalysts and epoxy curing agents and may be represented by the following formulae:

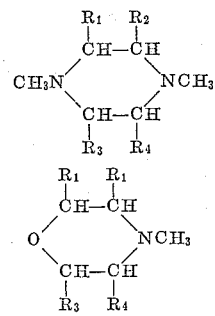

wherein $R_1$, $R_2$, $R_3$ and $R_4$ may be hydrogen, methyl, or ethyl radicals which may be the same or different.

In carrying out the process of this invention the saturated nitrogen heterocycle starting material is a piperazine or alkyl-substituted piperazine corresponding to the formula:

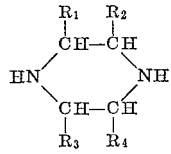

or a morpholine or alkyl-substituted morpholine corresponding to the formula:

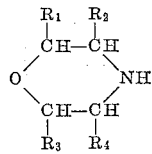

wherein $R_1$, $R_2$, $R_3$ and $R_4$ may be hydrogen, methyl, or ethyl radicals. It should be noted that $R_1$, $R_2$, $R_3$ and $R_4$ may be the same or different.

Representative of the piperazine compounds which may be employed in the reaction are piperazine, 2-methylpiperazine, 2,5-dimethylpiperazine, 2,6-dimethylpiperazine, 2,3,5,6-tetramethylpiperazine, 2-ethylpiperazine, 2,5-diethylpiperazine, 2,3,5-triethylpiperazine, 2-ethyl-5-methylpiperazine, 2,6-diethyl-3-methylpiperazine, 2-ethyl-3,6-dimethylpiperazine, 2,6-diethyl-3,5-dimethylpiperazine, 2-ethyl-3,5,6-trimethylpiperazine, and the like.

Typical examples of the morpholine compounds are morpholine, 2-methylmorpholine, 3,5-dimethylmorpholine, 2,5-dimethylmorpholine, 2-ethylmorpholine, 2,6-diethylmorpholine, 2,3,5,6-tetramethylmorpholine, 3-ethyl-5-methylmorpholine, 3,6-diethyl-5-methylmorpholine, 2,3,5-triethyl-6-methylmorpholine, 2-ethyl-3,5-dimethylmorpholine, 2,3-diethyl-5,6-dimethylmorpholine, and the like.

The formaldehyde employed may be either in the form of an aqueous solution of formaldehyde or as paraformaldehyde. However, the best conversions were obtained when a 50% aqueous solution of formaldehyde was employed. The quantity of formaldehyde used for the reaction depends upon the starting material. It was discovered that about 2 to 4 mols of formaldehyde per nitrogen atom to be substituted gave good conversions. However, the employment of 2.5 to 3.5 mols of formaldehyde per nitrogen atom resulted in the highest conversions. It should be noted that greater quantities of formaldehyde can be used and conversion is even increased slightly, but greater quantities of formaldehyde are not recommended for economic reasons and later difficulties in recovery of the reaction product. Therefore in the case where the starting material is a piperazine compound the preferred range is about 5 to 7 mols of formaldehyde per mol of piperazine compound and in the case of a morpholine compound the preferred range is about 2.5 to 3.5 mols of formaldehyde per mol of morpholine compound.

In carrying out the methylation reaction the saturated nitrogen heterocycle is mixed with formaldehyde. The reaction proceeds at about atmospheric pressure and at a temperature of about 85 to 100° C., preferably about 90 to 95° C. At the higher temperature range the rate of reaction is increased and the reaction time reduced to about 6 hours. During the reaction carbon dioxide gas is evolved and subsides when the methylation reaction is completed.

After the reaction is completed, the N-methylated heterocyclic compound is preferably recovered by first destroying the excess formaldehyde with sodium hydroxide and then rectifying the reaction mixture through a distillation column. The product is collected as a water-amine azeotrope. To obtain the anhydrous amine the water-amine product is treated with sodium hydroxide to separate and dry the amine layer. Then distillation of the amine layer provides the pure anhydrous N-methylated heterocycle in high conversions. Conversions of greater than 80% have been obtained by the use of the process of this invention.

The following examples are set forth to illustrate the process of the invention and should not be used to unduly restrict the scope of the invention as it has been described herein. The percent conversion to the N,N'-dimethylpiperazine or N-methylmorpholine products reported in the examples previously mentioned was calculated as follows:

Percent conversion to product $$= \frac{\text{moles of product obtained}}{\text{moles of heterocycle charged}} \times 100$$

Example 1

A five-liter, three-necked flask equipped with stirrer, reflux condenser, thermometer and addition funnel was charged with 2160 grams (36 mols) of 50% formaldehyde solution. From the funnel 773 grams (6 mols) of 77.6% 2-methylpiperazine were added with mixing over about 20 minutes. The temperature was held at 90 to 95° C. after addition of the 2-methylpiperazine and the reaction was carried out until the gas evolution ceased after about 6 hours. The reaction mixture was cooled to 80° C. and the excess formaldehyde destroyed with 800 grams of sodium hydroxide. Then the mixture was fractionally distilled and the 96 to 99° C. fraction collected. 1727 grams were obtained which had an analysis of 35.8% 1,2,4-trimethylpiperazine and the conversion calculated to be 80.7%.

Example 2

The flask described in Example 1 was charged with 3675 grams (45.3 mols) of 37% formaldehyde, and 650 grams (7.56 mols) of piperazine were run into the flask while mixing. The temperature of the reaction mixture was held at 90 to 95° C. for 10 hours until the carbon dioxide evolution subsided. 460 grams of 50% sodium hydroxide were added to the resulting solution, after cooling to 50° C., to destroy the excess formaldehyde. The mixture was fractionated and the 97 to 98.5° C. azeotrope fraction collected. This water-amine azeotrope was treated with 50% sodium hydroxide to separate the amine layer and further treatment dried this layer. The amine layer was distilled and 603 grams of 1,4-dimethylpiperazine having a boiling point of 129.5 to 131° C. were obtained which corresponded to a 70% conversion.

Example 3

Anhydrous 1,2,4,6-tetramethylpiperazine was prepared according to the procedure of Example 2. 3150 ml. (42 mols) of 37% formaldehyde solution were reacted with 800 grams (7 mols) of 2,6-dimethylpiperazine for about 8 hours at 90 to 95° C. The mixture after the formaldehyde was destroyed with sodium hydroxide was fractionated and the 97 to 99° C. azeotrope collected. The amine layer after separation and drying was distilled and 774 grams of 1,2,4,6-tetramethylpiperazine boiling at 167 to 168.5° C. were obtained. The conversion was 78%.

Example 4

Anhydrous 1,2,4,5-tetramethylpiperazine (cis) was prepared according to the procedure of Example 2. 2700 ml. (36 mols) of 37% formaldehyde solution were reacted with 690 grams (6 mols) of cis-2,5-dimethylpiperazine. The reaction proceeded at 90 to 95° C. for about 8 hours until the carbon dioxide evolution subsided. After destruction of the excess formaldehyde the mixture was fractionated and the 97 to 99° C. azeotrope collected. By the use of sodium hydroxide the amine layer was separated and dried. Distillation gave 601 grams (71% conversion) of 1,2,4,5-tetramethylpiperazine (cis) having a boiling point of 165 to 166° C.

Example 5

This procedure was conducted similarly to Example 2. 3150 ml. (42 mols) of 37% formaldehyde were reacted with 994 grams (7 mols) of 2,3,5,6-tetramethylpiperazine at 90 to 95° C. for about 4 hours. After cooling to below 50° C., 840 grams of 50% caustic were added and the mixture was flash distilled through a Vigreux column of 8 inches. Methanol was flashed over first and then the water-amine azeotrope flashed over and was collected. The azeotrope mixture was dried over 50% caustic and fractionated. The 94 to 96° C. fraction was collected which gave 780 grams (66% conversion) of 1,2,3,4,5,6-hexamethylpiperazine having a boiling point of 94 to 96° C.

Example 6

Anhydrous 4-methylmorpholine was prepared according to the procedure of Example 2.

870 grams (10 mols) of morpholine were added to 2250 ml. (30 mols) of 37% formaldehyde solution. The methylation reaction was carried out at a temperature range of 90 to 95° C. for about 10 hours. After cooling to 30° C., 600 grams of 50% sodium hydroxide were added and the mixture fractionated. The 91 to 95° C. water-amine azeotrope was collected, and the amine layer separated and dried with sodium hydroxide. Distillation of the amine layer gave 821 grams of 4-methylmorpholine or 81.3% conversion.

Example 7

A procedure similar to that of Example 2 was employed to prepare trimethylmorpholine from a mixture of 2,5-dimethylmorpholine and 3,5-dimethylmorpholine. 1150 grams (10 mols) of the dimethylmorpholine mixture were added to 2430 grams (30 mols) of 37% formaldehyde solution. The resulting solution was reacted at 90 to 95° C. for 8 hours. After the reaction was complete and the excess formaldehyde destroyed, the solution was rectified through a column. The water azeotrope boiling at 94 to 97° C. was collected and rectification of this material gave three distinct fractions boiling at 138.5° C., 147.5° C. and 149° C. having a total weight of 1025 grams (79.5% conversion). Each fraction had a tertiary nitrogen content the same as total nitrogen.

Thus the methylation of piperazines and morpholines carried out at atmospheric pressure and in the presence of a large excess of formaldehyde results in high conversions and eliminates the disadvantages of Eschweiler's process and therefore is unquestionably a significant improvement in the preparation of N-methylated heterocycles.

I claim:

1. In a process for preparing N-methylated heterocycles by contacting formaldehyde with a saturated nitrogen heterocycle corresponding to the formula:

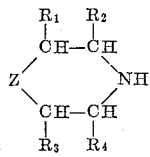

wherein $R_1$, $R_2$, $R_3$ and $R_4$ are members selected from the group consisting of hydrogen, methyl and ethyl radicals and wherein Z is a member selected from the group consisting of O and NH, the improvement which comprises contacting said reactants in the proportion of about 2 to 4 mols of formaldehyde per nitrogen atom in said heterocycle at a temperature of about 85 to 100° C. and at about atmospheric pressure.

2. In a process for preparing N,N'-dimethylpiperazine by contacting formaldehyde with a piperazine compound corresponding to the formula:

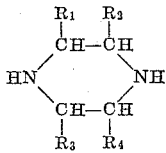

wherein $R_1$, $R_2$, $R_3$ and $R_4$ are members selected from the group consisting of hydrogen, methyl and ethyl radicals the improvement which comprises contacting said reactants in the proportion of about 5 to 7 mols of formaldehyde per mol of piperazine at a temperature of about 90 to 95° C. and at about atmospheric pressure.

3. A process according to claim 2 wherein said piperazine compound is piperazine.

4. A process according to claim 2 wherein said piperazine compound is 2-methylpiperazine.

5. A process according to claim 2 wherein said piperazine compound is 2,5-dimethylpiperazine.

6. A process according to claim 2 wherein said piperazine compound is 2,6-dimethylpiperazine.

7. In a process for preparing N-methylmorpholine by contacting formaldehyde with a morpholine compound corresponding to the formula:

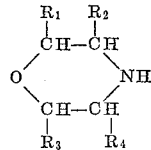

wherein $R_1$, $R_2$, $R_3$ and $R_4$ are members selected from the group consisting of hydrogen, methyl and ethyl radicals the improvement which comprises contacting said reactants in the proportion of about 2.5 to 3.5 mols of formaldehyde per mol of morpholine at a temperature of about 90 to 95° C. and at about atmospheric pressure.

8. A process according to claim 7 wherein said morpholine compound is morpholine.

9. A process according to claim 7 wherein said morpholine compound is 2,5-dimethylmorpholine.

10. A process according to claim 7 wherein said morpholine compound is 3,5-dimethylmorpholine.

11. A process according to claim 7 wherein said morpholine compound is a mixture of 2,5-dimethylmorpholine and 3,5-dimethylmorpholine.

References Cited in the file of this patent
UNITED STATES PATENTS 2,639,284     Morren _____ May 19, 1953

OTHER REFERENCES

Eschweiler: Chemische Berichte, 28c, 581 (1895).
Eschweiler: Chemische Berichte, 38, 880–882 (1905).